(12) United States Patent
Okabayashi et al.

(10) Patent No.: US 9,083,184 B2
(45) Date of Patent: Jul. 14, 2015

(54) BATTERY PACK FOR ELECTRIC POWER TOOL, AND BATTERY CONNECTION DEVICE

(75) Inventors: Hisakazu Okabayashi, Anjo (JP); Masafumi Noda, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 359 days.

(21) Appl. No.: 13/513,445

(22) PCT Filed: Dec. 17, 2010

(86) PCT No.: PCT/JP2010/072789
§ 371 (c)(1),
(2), (4) Date: Jun. 1, 2012

(87) PCT Pub. No.: WO2011/078086
PCT Pub. Date: Jun. 30, 2011

(65) Prior Publication Data
US 2012/0235628 A1    Sep. 20, 2012

(30) Foreign Application Priority Data
Dec. 25, 2009    (JP) .................................. 2009-295265

(51) Int. Cl.
H02J 7/00          (2006.01)
H04L 9/32          (2006.01)

(52) U.S. Cl.
CPC ................. *H02J 7/00* (2013.01); *H04L 9/3271* (2013.01); *H02J 2007/0001* (2013.01)

(58) Field of Classification Search
CPC .................................................. G01R 31/3655
USPC ........................................................ 320/128
See application file for complete search history.

(56) References Cited

U.S. PATENT DOCUMENTS

| 5,608,306 | A |   | 3/1997 | Rybeck et al. |
|---|---|---|---|---|
| 5,633,573 | A | * | 5/1997 | van Phuoc et al. ............ 320/128 |
| 6,028,937 | A |   | 2/2000 | Tatebayashi et al. |
| 7,948,207 | B2 | * | 5/2011 | Scheucher .................... 320/104 |

FOREIGN PATENT DOCUMENTS

| JP | A-09-500520 | 1/1997 |
|---|---|---|
| JP | A-09-107350 | 4/1997 |

(Continued)

OTHER PUBLICATIONS

Apr. 23, 2013 Notice of Reason(s) for Rejection issued in Japanese Application No. 2009-295265 (with partial translation).

(Continued)

*Primary Examiner* — Thuan Do
(74) *Attorney, Agent, or Firm* — Oliff PLC

(57) ABSTRACT

A battery connection device is provided with an authentication data creating unit that creates authentication data, a conversion unit that performs a first conversion of the authentication data, a transmission unit that transmits the authentication data to a battery pack, a receiving unit that receives from the battery pack a battery-side conversion result that is data obtained after the authentication data is converted by the battery pack, a reverse conversion unit that, on an assumption that the battery pack creates the battery-side conversion result by performing the first conversion and a second conversion on the authentication data, performs a reverse conversion of the second conversion on the battery-side conversion result, and a determination unit that determines whether or not the battery pack is an authentic product by comparing a result of the reverse conversion with a result of the first conversion.

11 Claims, 10 Drawing Sheets

(56) References Cited

FOREIGN PATENT DOCUMENTS

| | | |
|---|---|---|
| JP | A-2005-176231 | 6/2005 |
| JP | A-2005-202757 | 7/2005 |
| JP | A-2008-234051 | 10/2008 |
| WO | WO 95/25375 | 9/1995 |
| WO | WO 2008/083053 A2 | 7/2008 |

OTHER PUBLICATIONS

Jan. 20, 2014 Office Action issued in Chinese Patent Application No. 201080059184.9.

Chinese Office Action issued in Chinese Patent Application No. 201080059184.9 on Jan. 20, 2014.

Mar. 8, 2011 International Search Report issued in International Patent Application No. PCT/JP2010/072789.

Aug. 14, 2012 English Translation of International Preliminary Report on Patentability issued in PCT/JP2010/072789.

Aug. 27, 2013 Office Action issued in Japanese Patent Application No. 2009-295265 (with translation).

Nov. 3, 2014 Office Action issued in Chinese Application No. 201080059184.9.

\* cited by examiner

BATTERY PACK FOR ELECTRIC POWER TOOL, AND BATTERY CONNECTION DEVICE

CROSS-REFERENCE TO RELATED APPLICATIONS

This international application claims priority from Japanese Patent Application No. 2009-295265 filed on Dec. 25, 2009 in the Japan Patent Office, the entire disclosure of which is incorporated herein by reference.

TECHNICAL FIELD

The present invention relates to a battery pack for electric power tool, and a battery connection device that electrically connects with the battery pack for electric power tool.

BACKGROUND ART

Conventionally, there are electronic devices known as battery connection devices which electrically connect with a battery pack for electric power tool. Such electronic devices include a charging device for charging the battery pack, an electric power tool to which electric power is supplied from the battery pack for electric power tool, and a radio to which electric power is supplied from the battery pack for electric power tool.

Other than authentic battery packs manufactured by official manufacturers, inauthentic battery packs are sometimes distributed which are copies of the authentic products. When such inauthentic battery packs are connected to the battery connection devices, there is a risk of damage to the battery connection devices or generation of abnormal heat in the battery packs.

For example, in the invention of Patent Document 1, in order to inhibit a battery connection device from damage or generation of abnormal heat due to connection with an inauthentic battery pack, the battery connection device is configured to determine whether the battery pack is an authentic product or an inauthentic product.

In the invention of Patent Document 1, a battery pack and an application circuit such as a charging device that charges the battery pack, respectively convert a random number for authentication based on a given formula. If conversion results are equal to each other, it is determined that the battery pack is an authentic product. If not, it is determined that the battery pack is an inauthentic product.

PRIOR ART DOCUMENT

Patent Document

[Patent Document 1] Specification of U.S. Pat. No. 5,608,306

SUMMARY OF THE INVENTION

Problems to be Solved by the Invention

However, in such a system as in the invention of Patent Document 1 where the same random number is converted in both the application circuit and the battery pack and comparison is made between the conversion results, there is a risk that the random number and the conversion results are detected through data communication between the application circuit and an authentic battery pack, and thus the formula to convert the random number can be decrypted. Battery packs that are manufactured illegally by decryption of the formula can perform the same conversion using the same formula as that of the authentic battery pack, and thus no longer determined as inauthentic products.

In a first aspect of the present invention, it is preferable that it would be difficult for a third party to copy the battery pack.

Means for Solving the Problems

A battery connection device of the present invention may include an authentication data creating unit, a conversion unit, a transmission unit, a receiving unit, a reverse conversion unit, and a determination unit. The authentication data creating unit creates authentication data. The conversion unit performs a first conversion of the authentication data created by the authentication data creating unit. The transmission unit transmits to a battery pack the authentication data created by the authentication data creating unit when the battery pack is electrically connected to the battery connection device. The receiving unit receives from the battery pack a battery-side conversion result that is data obtained after the authentication data is converted by the battery pack. The reverse conversion unit, on an assumption that the battery pack as an authentic product creates the battery-side conversion result by performing the first conversion and further a second conversion on the authentication data, performs a reverse conversion of the second conversion on the battery-side conversion result received by the receiving unit. The determination unit compares a result of the reverse conversion performed by the reverse conversion unit with a result of the first conversion performed by the conversion unit and determines whether or not the battery pack is an authentic product.

In this way, in the battery connection device, a reverse conversion result which is the result of the reverse conversion performed on the battery-side conversion result received from the battery pack is compared with a first conversion result which is the result of the first conversion performed on the authentication data created by the battery connection device itself. If a result of comparison shows that the both results are equal, it can be determined that the battery pack is an authentic product.

The authentic battery pack is required to perform the first conversion performed by the conversion unit of the battery connection device as well as the second conversion which is subject to the reverse conversion performed in the battery connection device. Therefore, even if a third party detects the communication between the battery connection device and the authentic battery pack, it is difficult to decrypt the first conversion performed by the conversion unit of the battery connection device as well, as the second conversion which is subject to the reverse conversion performed in the battery connection device, to copy the authentic battery pack.

Here, the battery connection device may be any device, if electrically connected with the battery pack.

For example, the battery connection device may be a charging device of the battery pack. Because the charging device of the battery pack supplies electric power to the battery pack to charge the battery pack, the charging device may be damaged or the battery pack may generate abnormal heat if charging is performed on an inauthentic battery pack. Therefore, it is necessary to be able to properly determine whether or not the battery pack is an authentic product.

The charging device, if the reverse conversion result by the charging device is equal to the first conversion result by the charging device, may allow charging of the battery pack. Thereby, charging is properly performed when the battery pack is an authentic battery pack.

On the other hand, the charging device, if the reverse conversion result by the charging device is different from the first conversion result by the charging device, may prohibit or limit charging of the battery pack. In this way, even if an inauthentic battery pack is connected, the charging device does not charge the battery pack. Or, even if charging is performed, the battery pack is not overcharged. Therefore, damage in the charging device or generation of abnormal heat in the battery pack can be inhibited.

Further, if the reverse conversion result is different from the first conversion result, the charging device may warn of abnormity by a buzzer or alarm light. According to the above charging device, it is possible to notify the user that charging is not performed since the connected battery pack is an inauthentic product.

In addition, the battery connection device may be an electric power tool body powered by a battery pack. Since electric power is supplied from the battery pack to the electric power tool body, there is a risk of damage to the electric power tool body if electric power is supplied from an inauthentic battery pack, because electric power having a proper value may not be supplied. Also, if an inauthentic battery pack is connected to the electric power tool body and used, there is a risk of generation of abnormal heat in the battery pack. Therefore, it is necessary to be able to properly determine whether or not the battery pack is an authentic product.

The electric power tool body, if the reverse conversion result by the electric power tool body is equal to the first conversion result by the electric power tool body, may allow supply of electric power from the battery pack. This enables proper power to be supplied from the authentic battery pack. The electric power tool body works properly.

On the other hand, the electric power tool body, if the reverse conversion result by the electric power tool body is different from the first conversion result by the electric power tool body, may prohibit supply of electric power from the battery pack. Thereby, no electric power is supplied to the electric power tool body even if an inauthentic battery pack is connected. Thus, the electric power tool body can be inhibited from damage. Also, by prohibiting supply of electric power from the inauthentic battery pack, generation of abnormal heat in the battery pack can be inhibited.

Further, if the reverse conversion result is different from the first conversion result, the electric power tool body may warn of abnormity by a buzzer or alarm light. According to the above electric power tool body, it is possible to notify the user that the electric power tool body does not work because the connected battery pack is an inauthentic product.

In addition, the battery connection device may perform the first conversion using one fixed formula. Storage capacity of the battery connection device can be lower than if a plurality of types of formulas are stored and one formula is chosen therefrom to perform the first conversion.

Also, the battery pack of the present invention includes a receiving unit, a conversion unit, and a transmission unit. The receiving unit receives authentication data from the battery connection device, when the battery connection device is electrically connected with the battery pack. The conversion unit performs a first conversion of the authentication data received by the receiving unit, and further performs a second conversion on a result of the first conversion. The transmission unit transmits a result of the second conversion to the battery connection device.

In this way, in the battery pack, the first conversion is performed on the authentication data received from the battery connection device, and the second conversion is further performed on the result of the first conversion. Then, the result of the second conversion is transmitted to the battery connection device.

Therefore, even if the communication between the battery connection device and an authentic battery pack is detected by a third party, it is difficult to decrypt the two-step conversion process by the first conversion and the second conversion performed by the conversion unit of the battery pack thereby to copy the authentic battery pack.

In addition, the battery pack can perform each of the first conversion and second conversion using one fixed formula, Thereby, storage capacity of the battery pack can be lower than if a plurality of types of formulas for each of the first and second conversions are stored and one formula is chosen therefrom to perform each of the first and second conversions.

EXPLANATION OF REFERENCE NUMERALS

10 . . . driver drill (electric power tool), 12 . . . driver drill body (electric power tool body), 100, 300 . . . battery pack, 110 . . . microcomputer (receiving unit, conversion unit, transmission unit), 200 . . . charging device (battery connection device), 210 . . . microcomputer (authentication data creating unit, conversion unit, transmission unit, receiving unit, reverse conversion unit, determination unit, warning unit), 302 . . . adapter (battery connection device)

MODE FOR CARRYING OUT THE INVENTION

Hereinafter, an embodiment of the present invention will be described by way of drawings.

First Embodiment

Overall Configuration

Figure 1:
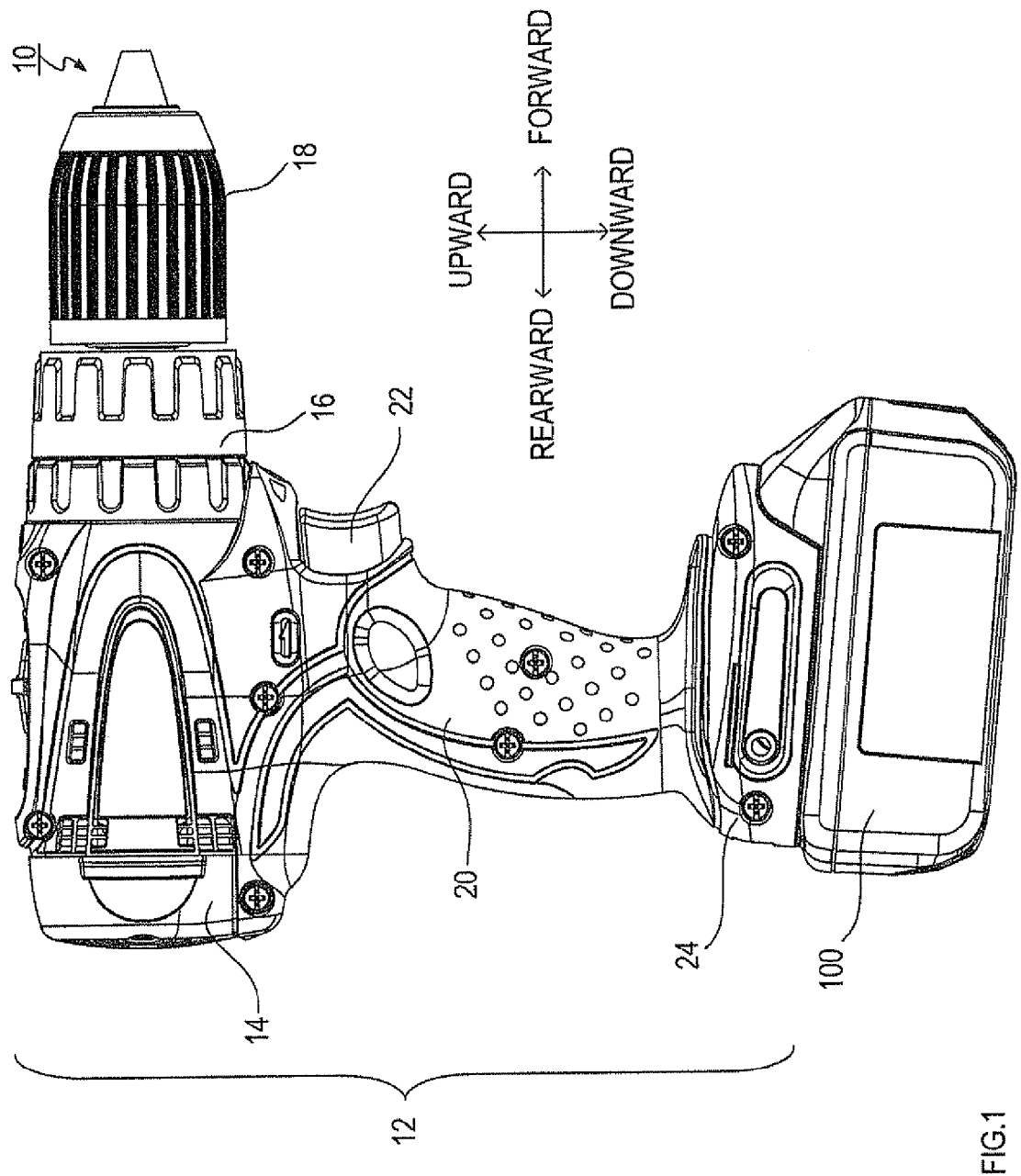
FIG. 1 is a side view showing a driver drill of a first embodiment to which a battery pack is attached.

FIG. 1 is a side view of a driver drill to which the present invention is applied.

As shown in FIG. 1, a driver drill body 12 of the driver drill 10 includes a motor housing 14, a gear housing 16 located in front of the motor housing 14, a drill chuck 18 located in front of the gear housing 16, and a hand grip 20 located below the motor housing 14.

The motor housing 14 houses a motor 60 (see FIG. 4; not shown in FIG. 1) that generates a drive force for rotatably driving the drill chuck 18.

The gear housing 16 houses a gear mechanism (not shown) that transmits the drive force of the motor 60 to the drill chuck 18.

The drill chuck 18 is provided with a connection mechanism (not shown) that detachably connects a tool bit (not shown) to a front end portion of the drill chuck 18.

The hand grip 20 is formed into a shape such that an operator of the driver drill 10 can hold the hand grip 20 with one hand. In front at the top of the hand grip 20, a trigger switch 22 is provided for a user of the driver drill 10 to turn ON/OFF the motor. To the lower end of the hand grip 20, a battery pack connecting section 24 is provided which detachably connects a battery pack 100.

Figure 2:
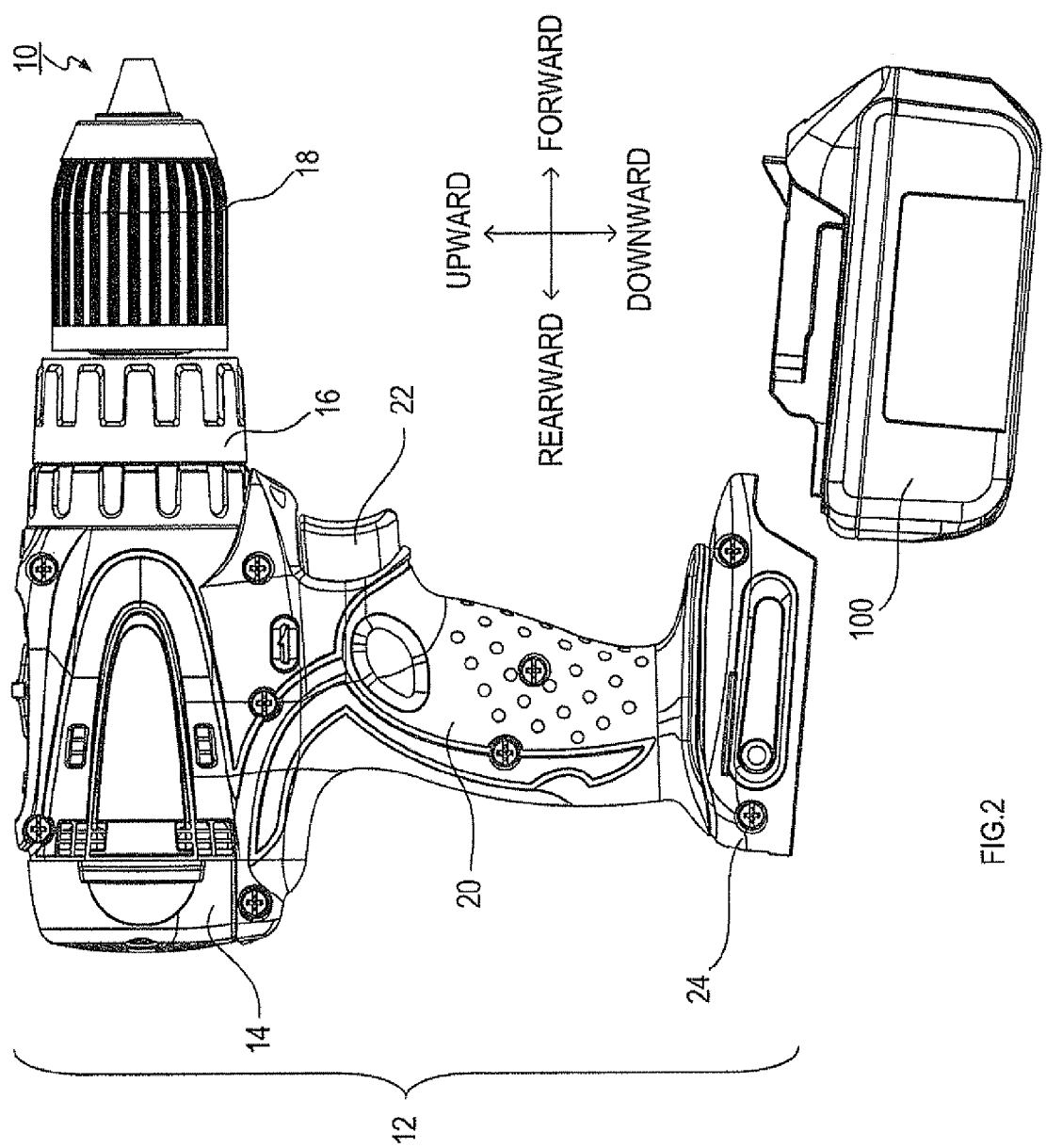
FIG. 2 is a side view showing the driver drill from which the battery pack is detached.

As shown in FIG. 2, the battery pack connecting section 24 is configured so that the user of the driver drill 10 can detach the battery pack 100 from the battery pack connecting section 24 by sliding the battery pack 100 to the front.

(Overall Configuration of the Battery Pack 100 and the Charging Device 200)

Figure 3A:
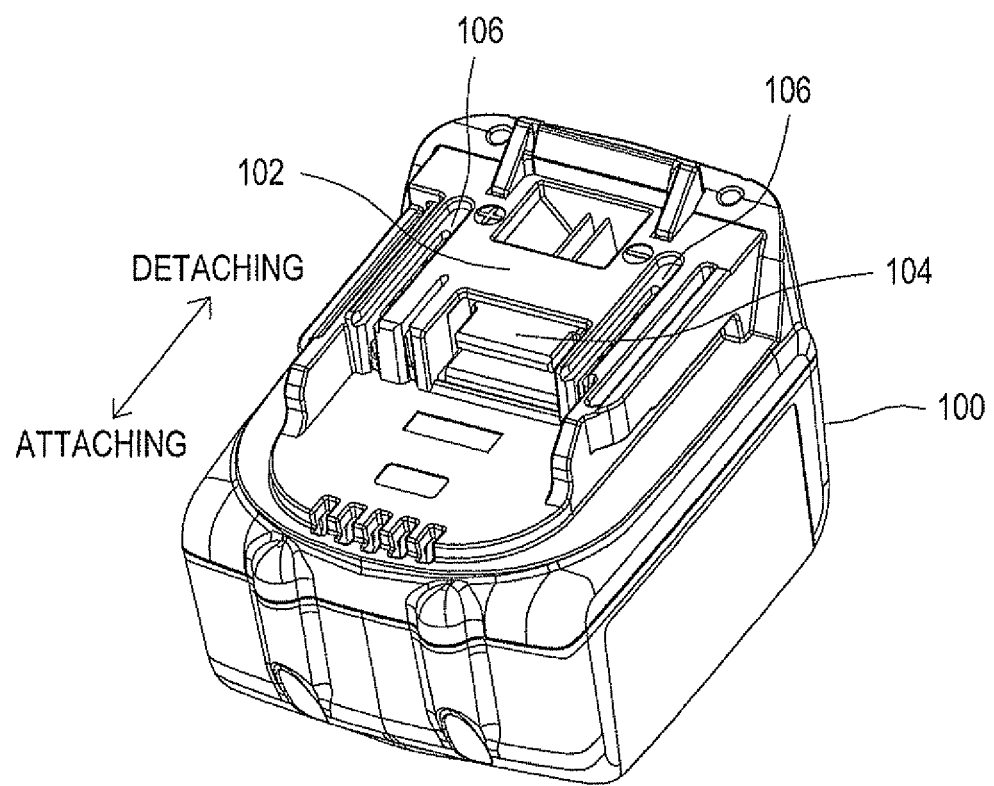
FIG. 3A is a perspective view showing the battery pack.
Figure 3B:
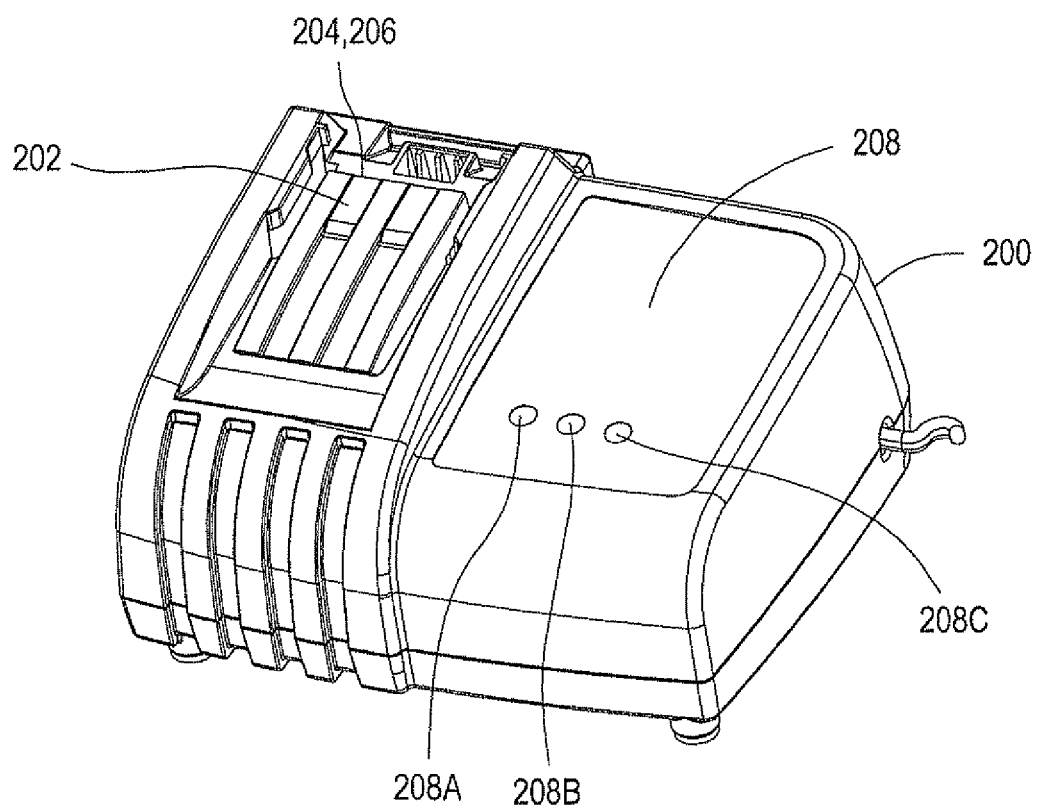
FIG. 3B is a perspective view showing a charging device.

As shown in FIG. 3A, a connector section 102 is provided on top of the battery pack 100. The battery pack 100 is charged by electrically connecting with the charging device 200 shown in FIG. 3B. In FIGS. 3A and 3B, the size ratio between the charging device 200 and the battery pack 100 is not accurate. In practice, the size ratio is set such that a later described microcomputer terminal section 104 of the battery pack 100 can be received by a later described a microcomputer terminal receiving section 204 of the charging device 200.

The connector section 102 is configured to be able to connect with the charging device 200 by sliding on the charging device 200. The microcomputer terminal section 104 is provided near the center of the connector section 102, A power terminal section 106 is provided on both sides of the microcomputer terminal section 104 in the connector section 102.

A plurality of terminals for microcomputer are provided in the microcomputer terminal section 104. A plurality of power terminals are provided in the power terminal section 106.

As shown in FIG. 3B, the charging device 200 is provided with a battery mounting section 202 and a display section 208 on top of the charging device 200.

The battery pack 100 is attached to the charging device 200 such that the connector section 102 and the battery mounting section 202 face each other, The battery mounting section 202 is configured to be able to guide the battery pack 100 along an attaching direction to the charging device 200. Specifically, the battery mounting section 202 is configured such that the connector section 102 of the battery pack 100 is able to slide on the battery mounting section 202. In the battery mounting section 202, the microcomputer terminal receiving section 204 and a power terminal connecting section 206 are respectively provided at a site where the microcomputer terminal section 104 and the power terminal section 106 of the battery pack 100 connected to the battery mounting section 202 are located.

Inside the microcomputer terminal receiving section 204, a plurality of terminals to be electrically connected to the plurality of terminals of the microcomputer terminal section 104 are provided. On the other hand, inside the power terminal connecting section 206, a plurality of power terminals to be electrically connected to the plurality of power terminals of the power terminal section 106 are provided.

(Electrical Configuration of the Driver Drill Body 12 and the Battery Pack 100)

Figure 4:
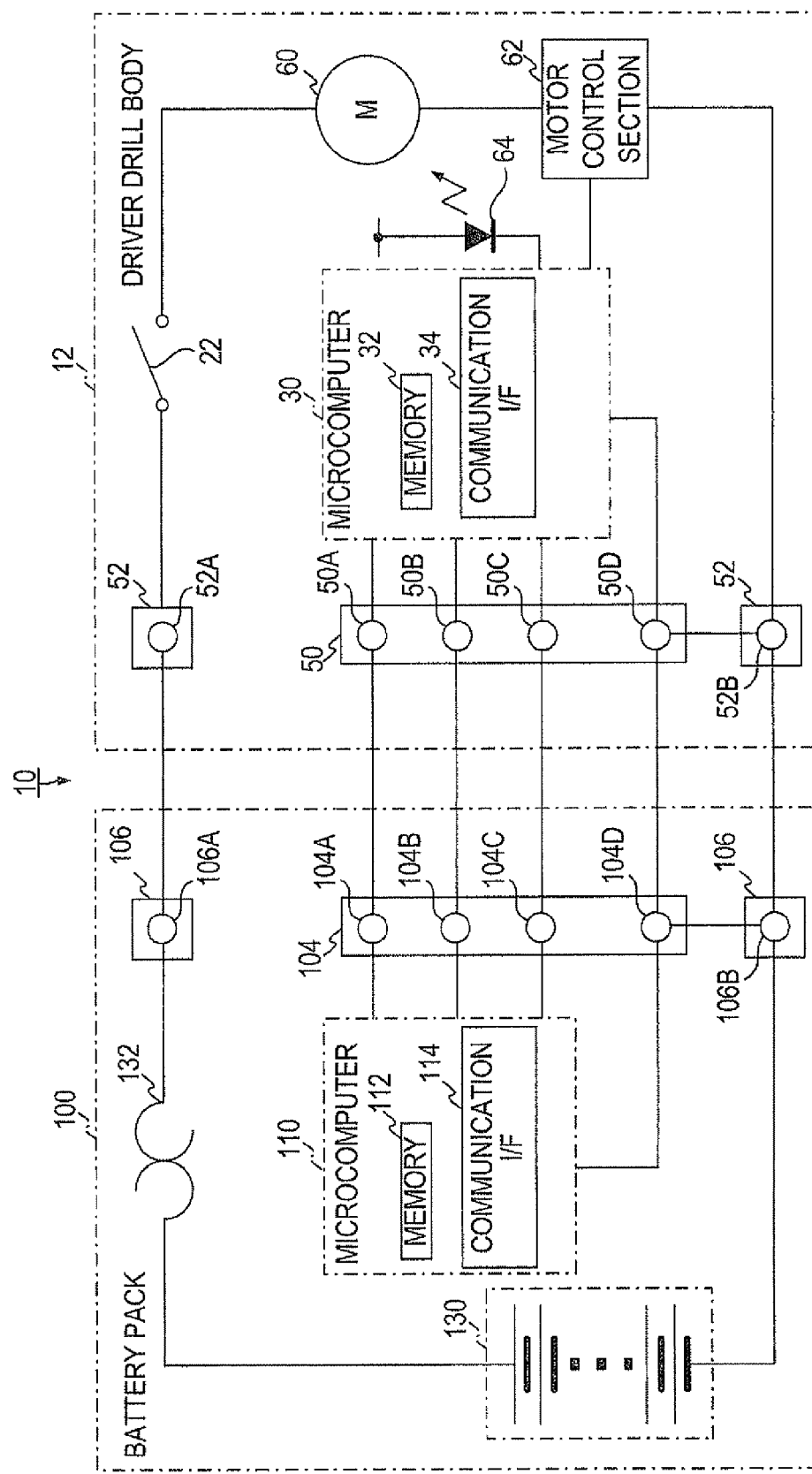
FIG. 4 is a block diagram showing an electrical configuration of the driver drill and the battery pack.

FIG. 4 shows the state in which the battery pack 100 is attached to the driver drill body 12.

(Electrical Configuration of the Driver Drill Body 12)

The driver drill body 12 includes a microcomputer 30, a microcomputer terminal section 50, a power terminal connecting section 52, the motor 60, and a motor control section 62. The microcomputer 30 is configured as a so-called one-chip microcomputer, and includes therein a memory 32 and a communication interface (I/F) 34, etc.

The memory 32 includes a ROM, a RAM and nonvolatile memory which are not shown. The nonvolatile memory can be any storage element as long as the stored contents are rewritable. For example, an EEPROM and a flash memory can be used. In the present embodiment, a program for performing authentication, a program for the microcomputer 30 to drive control the motor 60 in accordance with manipulation of a trigger switch (motor control program), etc. are stored in the nonvolatile memory.

The microcomputer 30 is connected to the plurality of terminals for microcomputer provided in the microcomputer terminal section 50 of the driver drill body 12. More specifically, the microcomputer 30 is connected to a power supply terminal 50A, a temperature data terminal 50B, a data communication terminal 50C and a GND terminal 50D.

The power supply terminal 50A is a power supply terminal for microcomputer for receiving power supply to the microcomputer 30 from the battery pack 100. The power supply terminal 50A is connected with a power supply terminal 104A of the battery pack 100, when the battery pack 100 is attached to the driver drill body 12 (when the driver drill body 12 and the battery pack 100 are electrically connected).

The temperature data terminal 50B is a terminal for inputting to the microcomputer 30 a temperature signal that is outputted from a microcomputer 110 of the battery pack 100. The temperature data terminal 50B, when the battery pack 100 is attached to the driver drill body 12 (when the battery pack 100 and the driver drill body 12 are electrically connected), is connected with a temperature data terminal 104B of the battery pack 100.

The data communication terminal 50C is a terminal for outputting to the battery pack 100 a data signal outputted from the microcomputer 30 or inputting to the microcomputer 30 a data signal outputted from the battery pack 100. The data communication terminal 50C, when the battery pack 100 is attached to the driver drill body 12 (when the battery pack 100 and the driver drill body 12 are electrically connected), is connected with a data communication terminal 104C of the battery pack 100.

The GND terminal 50D is terminal to which a reference potential in communication between the driver drill body 12 and the battery pack 100 is set.

A positive terminal 52A in the power terminal connecting section 52 of the driver drill body 12 is connected to a positive terminal 106A of the battery pack 100, when the battery pack 100 is attached to the driver drill body 12. A negative terminal 52B in the power terminal connecting section 52 of the driver drill body 12 is connected to a negative terminal 106B of the battery pack 100, when the battery pack 100 is attached to the driver drill body 12. The negative terminal 52B is electrically connected to the aforementioned GND terminal 50D. Electric power is supplied to the driver drill body 12 from the battery pack 100 via the positive terminal 52A and the negative terminal 52B.

The motor control section 62 is connected to the microcomputer 30 to control rotation of the motor 60 according to commands from the microcomputer 30.

In addition, the driver drill body 12 is provided with a plurality of LEDs 64 which are not shown in FIGS. 1 and 2. The LEDs 64 are connected to the microcomputer 30 to be turned on/off in response to commands from the microcomputer 30.

(Electrical Configuration of the Battery Pack 100)

The battery pack 100 includes the microcomputer 110, the microcomputer terminal section 104, the power terminal section 106 and a cell section 130. The microcomputer 110 is configured as a so-called one-chip microcomputer as well as the microcomputer 30, and includes therein a memory 112 and a communication I/F 114.

The memory 112 includes a ROM, a RAM, and a rewritable nonvolatile memory which are not shown. In the present embodiment, programs for the microcomputer 110 to perform charging control and authentication of the battery pack 100 are stored in the nonvolatile memory.

The microcomputer 110 is connected to a plurality of terminals for microcomputer provided in the microcomputer terminal section 104 of the battery pack 100. More specifically, the microcomputer 110 is connected to the power supply terminal 104A, the temperature data terminal 104B, the data communication terminal 104C, and a GND terminal 104D.

The power supply terminal 104A is a terminal for supplying electric power supplied from the cell section 130 of the battery pack 100 to the microcomputer 30 of the driver drill body 12, and for supplying electric power supplied from the charging device 200 to the microcomputer 110 of the battery pack 100.

The temperature data terminal 104B is a terminal for outputting to the driver drill body 12 or the charging device 200 an electric signal (temperature signal) that is outputted from the microcomputer 110 based on a temperature detected by a thermistor (not shown) provided in the battery pack 100.

The data communication terminal 104C is a terminal for outputting a data signal which is outputted from the microcomputer 110 to the driver drill body 12 or to the charging device 200, and for inputting a data signal outputted from the driver drill body 12 or from the charging device 200 to the microcomputer 110.

The GND terminal 104D is a terminal to which a reference potential in communication between the battery pack 100 and the driver drill body 12 or the charging device 200 is set.

A positive terminal 106A of the power terminal 106 is connected to the positive terminal 52 of the driver drill body 12, when the battery pack 100 is attached to the driver drill body 12. A negative terminal 106B of the power terminal 106 is connected to the negative terminal 52B of the driver drill body 12, when the battery pack 100 is attached to the driver drill body 12. The negative terminal 106B is electrically connected to the aforementioned GND terminal 104D.

The cell section 130 is provided with a plurality of cells connected in series. A positive electrode side of the cell section 130 is connected to the positive terminal 106A via a fuse 132. A negative electrode side of the cell section 130 is connected to the negative terminal 106B.

(Electrical Configuration of the Battery Pack 100 and the Charging Device 200)

Figure 5:
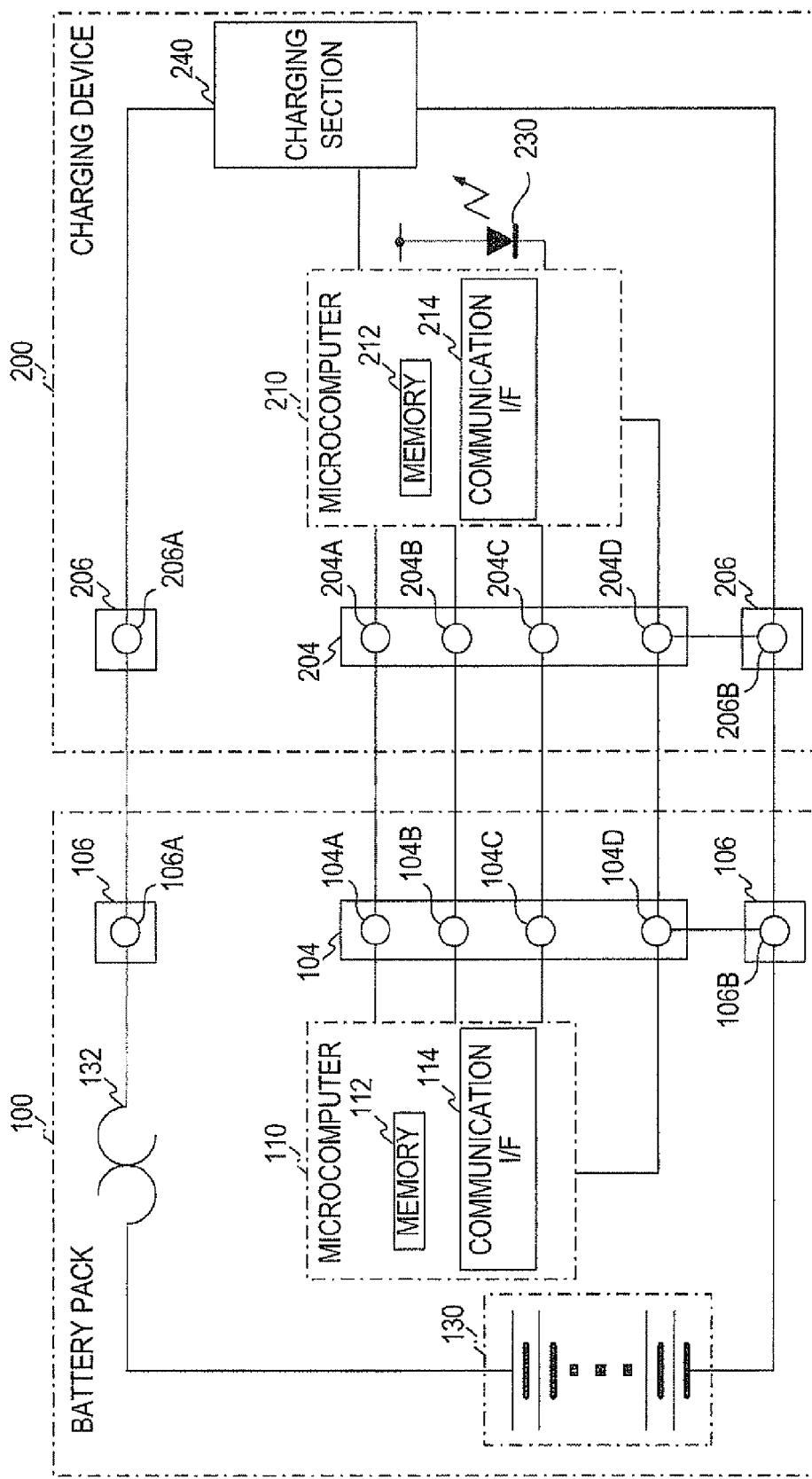
FIG. 5 is a block diagram showing an electrical configuration of the battery pack and the charging device.

FIG. 5 shows the state in which the battery pack 100 is attached to the charging device 200. Because the electrical configuration of the battery pack 100 is previously described, explanation thereof is not repeated.

(Electrical Configuration of the Charging Device 200)

The charging device 200 includes a microcomputer 210, the microcomputer terminal receiving section 204, the power terminal connecting section 206, and a charging section 240. The microcomputer 210 is configured as a one-chip microcomputer as well as the microcomputers 30 and 110 and includes therein a memory 212 and a communication I/F 214.

The memory 212 includes a ROM, a RAM, and a rewritable nonvolatile memory which are not shown. In the present embodiment, programs for the microcomputer 210 to perform charging control and authentication of the battery pack 100 are stored in the nonvolatile memory.

The microcomputer 210 is connected to a plurality of terminals for microcomputer provided in the microcomputer terminal receiving section 204 of the charging device 200. More specifically, the microcomputer 210 is connected to a power supply terminal 204A, a temperature data terminal 204B, a data communication terminal 204C, and a GND terminal 204D.

The power supply terminal 204A is a power supply terminal for microcomputer for supplying electric power from the charging device 200 to the microcomputer 110 of the battery pack 100. The power supply terminal 204A is connected with the power supply terminal 104A of the battery pack 100, when the battery pack 100 is connected to the charging device 200.

The temperature data terminal 204B is a terminal for inputting to the microcomputer 210 a temperature signal that is outputted from the microcomputer 110 of the battery pack 100. The temperature data terminal 20413 is connected with the temperature data terminal 10413 of the battery pack 100, when the battery pack 100 is connected to the charging device 200.

The data communication terminal 2040 is a terminal for inputting to the microcomputer 210 a data signal that is outputted from the microcomputer 110 of the battery pack 100, and for outputting to the microcomputer 110 a data signal which is outputted from the microcomputer 210. The data communication terminal 204C is connected with the data communication terminal 104C of the battery pack 100, when the battery pack 100 is connected to the charging device 200.

The GND terminal 204D is a terminal to which a reference potential in communication between the battery pack 100 and the charging device 200 is set. The GND terminal 204D is connected with the GND terminal 104D of the battery pack 100, when the battery pack 100 is connected to the charging device 200.

A positive terminal 206A of the power terminal connecting section 206 is connected to the positive terminal 106A of the battery pack 100, when the battery pack 100 is attached to the charging device 200. A negative terminal 206B of the power terminal connecting section 206 is connected to the negative terminal 106B of the battery pack 100, when the battery pack 100 is attached to the charging device 200. The negative terminal 206B is electrically connected with the aforementioned GND terminal 204B.

The charging device 200 is provided with a plurality of LEDs 230 which are light sources of indicator lamps 208A, 208B, and 208C (see FIG. 3) of a display section 208. The LEDs 230 are connected to the microcomputer 210 to be turned on/off in response to commands from the microcomputer 210.

The charging section 240 of the charging device 200 supplies electric power to the battery pack 100 via the positive terminal 206A and the negative terminal 206B. That is, the charging section 240 charges the battery pack 100. The charging section 240 is connected to the microcomputer 210, and is configured to charge the battery pack 100 in accordance with commands from the microcomputer 210.

(Authentication Routine 1)

When the charging device 200 charges the battery pack 100, there would be no problem if the battery pack 100 is an authentic product produced by an official manufacturer. If the battery pack 100 is an inauthentic product which is a copy of the authentic product, there is a risk of damage to the charging device 200 or generation of abnormal heat in the battery pack 100 upon charging. In order to authenticate that the battery pack 100 is an authentic product, the battery pack 100 and the charging device 200 perform an authentication routine 1 shown in FIG. 6.

The authentication routine 1 performed by the microcomputer 110 of the battery pack 100 and the microcomputer 210 of the charging device 200 will be described below based on FIG. 6. The authentication routine on the charging device 200 side is shown in S400 to S414. The authentication routine on the battery pack 100 side is shown in S500 to S506. The microcomputers 110 and 210 start this process when detecting that the battery pack 100 and the charging device 200 are electrically connected to each other based on the aforementioned temperature signal and/or communication signal.

(Authentication Routine on the Charging Device 200 Side)

First, the authentication routine on the charging device 200 side will be explained. The microcomputer 210 of the charging device 200, when detecting that the battery pack 100 is attached to the charging device 200 so that the battery pack 100 and the charging device 200 are electrically connected, creates random number data a (S400). The microcomputer 210 creates a random number data a from voltage data or temperature data of the battery pack 100 inputted from the microcomputer 110 of the battery pack 100 via the microcomputer terminal receiving section 204.

In addition, the microcomputer 210 creates data X for encryption based on the voltage data or temperature data of the battery pack 100 so as to encrypt the random number data a (S402). Then, the microcomputer 210 creates authentication data A by adding the data X for encryption to the random number data a in a prescribed manner and transmit the created authentication data A to the battery pack 100 via the microcomputer terminal receiving section 204 (S404).

The microcomputer 210, when receiving from the battery pack 100 answer data C which is data converted from the authentication data A (S406), unlocks encryption performed on the battery pack 100 side and creates unlocked data D from the answer data C (S408). Then, the microcomputer 210 converts the authentication data A using a formula F(A), to create determination data E on the charging device 200 side (S410).

Next, the microcomputer 210 determines whether or not the determination data E is equal to the unlocked data D decrypted (S412). If the determination data E is equal to the unlocked data D (S412: Yes), the microcomputer 210 determines that the battery pack 100 is an authentic product, and allows charging of the battery pack 100 (S416). Thereafter, this routine is terminated.

If the determination data E is different from the unlocked data D (S412: No), the microcomputer 210 determines that the battery pack 100 is an inauthentic product, and interrupts charging of the battery pack 100 as well as turns on the LEDs 230 for warning of the charging device 200 as alarm light for abnormity (S414). Thereafter, this routine is terminated. If the charging device 200 is equipped with a buzzer or speaker, the charging device 200 may also alarm the user of abnormity by beeps from the buzzer or speaker, instead of turning on the LEDs 230.

If the battery pack 100 is an inauthentic product, "abnormal battery" may be written on a flash memory or the like of the battery pack 100.

In addition, the microcomputer 210, if determining that the battery pack 100 is an inauthentic product, may stop charging after a certain period of time instead of immediately interrupting the charging. In this case, in order to inhibit overcharging, it is desirable that the magnitude of the charging current is smaller than the magnitude of the charging current when the battery pack 100 is an authentic product.

Also, it is desirable that, if not the charging device 200 but an electric power tool body to which electric power from the battery pack 100 is supplied determines that the battery pack 100 connected to the electric power tool body is an inauthentic product, the electric power tool body interrupts supply of electric power from the battery pack 100 immediately or after a certain period of time.

(Authentication Routine on the Battery Pack 100 Side)

The microcomputer 110 of the battery pack 100 receives the authentication data A transmitted from the charging device 200 via the microcomputer terminal section 104 (S500). The microcomputer 110 converts the received authentication data A using the formula F(A) to create determination data B on the battery pack 100 side (S502).

Further, the microcomputer 110 creates data Y for encryption based on the voltage data or temperature data of the battery pack 100 so as to encrypt the determination data B (S504). Then, the microcomputer 110 creates the answer data C by adding the data Y for encryption to the determination data B in a prescribed manner and transmits the created answer data C to the charging device 200 via the microcomputer terminal section 104 (S506). Thereafter, this routine is terminated.

In the authentication routine 1, transmission and reception of data is performed once between the battery pack 100 and the charging device 200 to determine whether or not the battery pack 100 is an authentic product. In contrast, whether or not the battery pack 100 is an authentic product may be determined by running the authentication process shown in FIG. 6 more than once between the battery pack 100 and the charging device 200.

In this case, the authentication process may be performed more than once before the charging device 200 charges the battery pack 100, or at certain intervals during the charging.

In the first embodiment described above, the answer data C is created in the battery pack 100 by performing the first conversion using the formula F(A) on the authentication data A created by the charging device 200 and further performing the second conversion of adding the data Y for encryption to the determination data B created using the formula F(A). The created answer data C is transmitted to the charging device 200 from the battery pack 100.

In the charging device 200, a reverse conversion which unlocks encryption by the second conversion is performed on the answer data C received from the battery pack 100 to create the unlocked data D. Then, the unlocked data D is compared with the determination data E created by converting the authentication data A using the formula F(A). Then, the charging device 200 determines whether or not the battery pack 100 is an authentic product based on the result of comparison between the determination data E and the unlocked data D.

In this way, the authentic battery pack 100 is required to properly perform the first conversion and the second conversion of the authentication data A which is the random number data a created at random and encrypted in the charging device 200. Therefore, even if the authentication data A and the answer data C are detected from communication between the battery pack 100 and the charging device 200, it is difficult to decrypt the two-step conversion process consisting of the first conversion and the second conversion. Accordingly, it is difficult to copy the authentic battery pack 100.

In addition, in the first embodiment, the charging device 200 and the battery pack 100 create the determination data E and B, respectively, using the one fixed formula F(A) as the first conversion. Thus, storage capacity of the charging device 200 and the battery pack 100 can be lower than if a plurality of types of formulas are stored and one formula is chosen therefrom to perform the first conversion.

In the first embodiment, the driver drill 10 corresponds to an example of the electric power tool of the present invention. The driver drill body 12 corresponds to an example of the electric power tool body as the battery connection device of the present invention.

The microcomputer 110 serves as an example of the receiving unit, the conversion unit and the transmission unit of the battery pack of the present invention. The microcomputer 210 serve as an example of the authentication data creating unit, the conversion unit, the transmission unit, the receiving unit, the reverse conversion unit, the determination unit and the warning unit of the battery connection device of the present invention.

Figure 6:
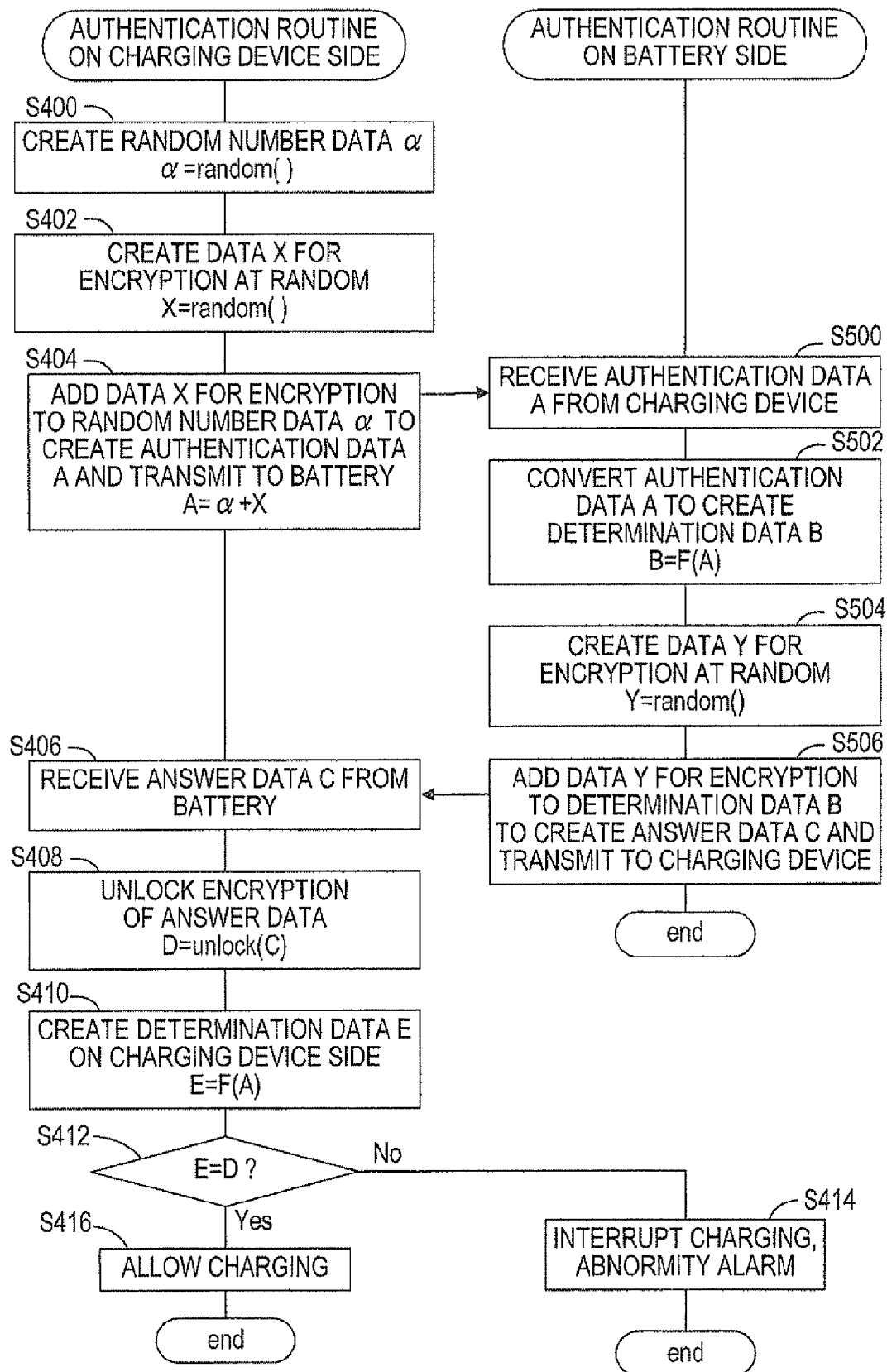
FIG. 6 is a flowchart showing an authentication routine 1 on the charging device side and the battery side.

In the first embodiment, with respect to the charging device 200, S400 to S404 in FIG. 6 correspond to an example of the function of the authentication data creating unit, S404 corresponds to an example of the function of the transmission unit, S406 corresponds to an example of the function of the receiving unit, S408 corresponds to an example of the function of the reverse conversion unit, S410 corresponds to an example of the function of the conversion unit, S412 and S416 correspond to an example of a function of the determination unit, and S414 corresponds to an example of the function of the warning unit.

With regard to the battery pack 100, S500 in FIG. 6 corresponds to an example of the function of the receiving unit, S502 to S506 correspond to an example of the function of the conversion unit, and S506 corresponds to an example of the function of the transmission unit.

Second Embodiment

The second embodiment of the present invention will be explained based on FIG. 7.

(Authentication Routine 2)

Figure 7A:
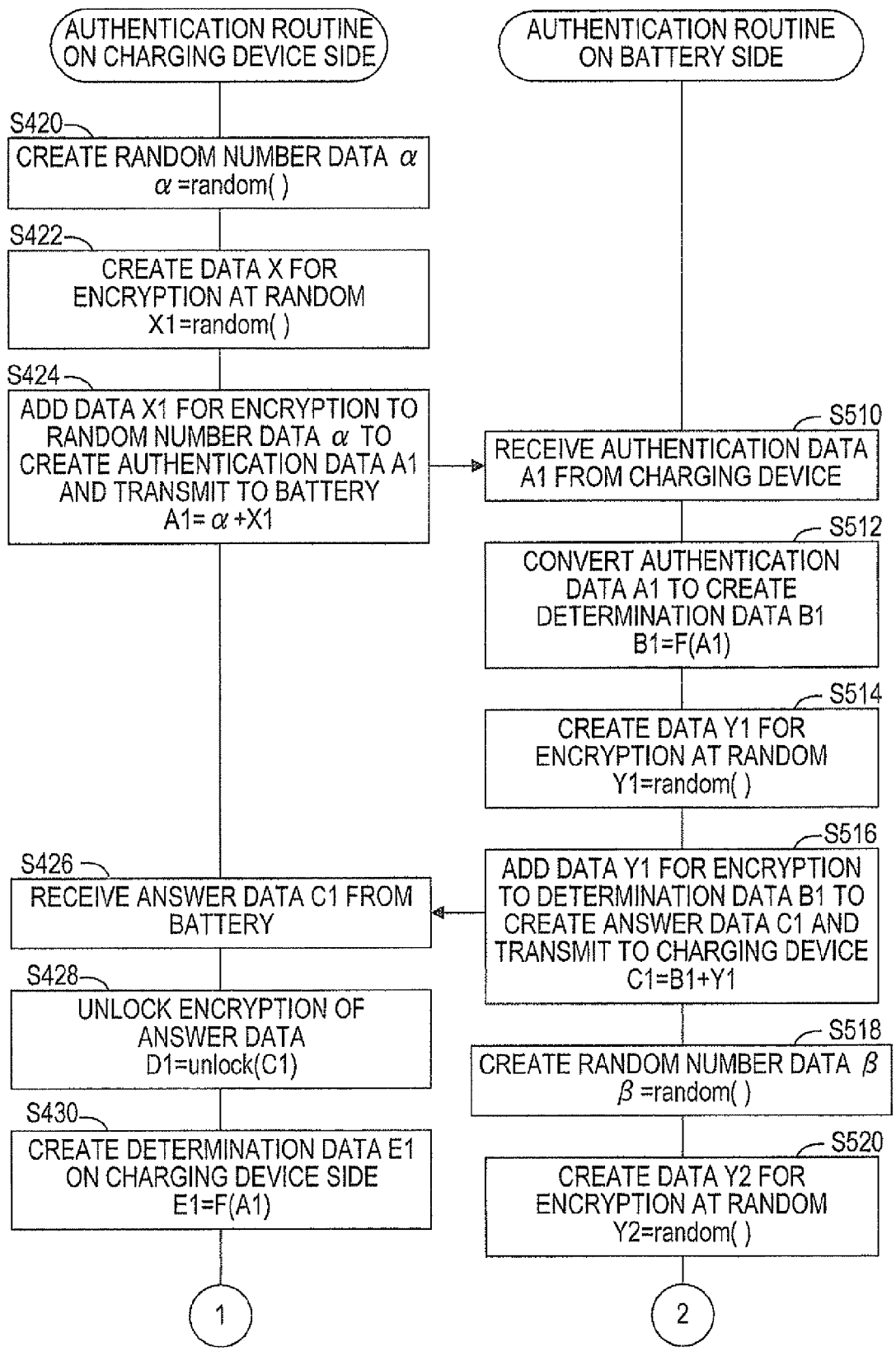
FIG. 7A is a flowchart showing an authentication routine 2 on the charging device side and the battery side according to a second embodiment.
Figure 7B:
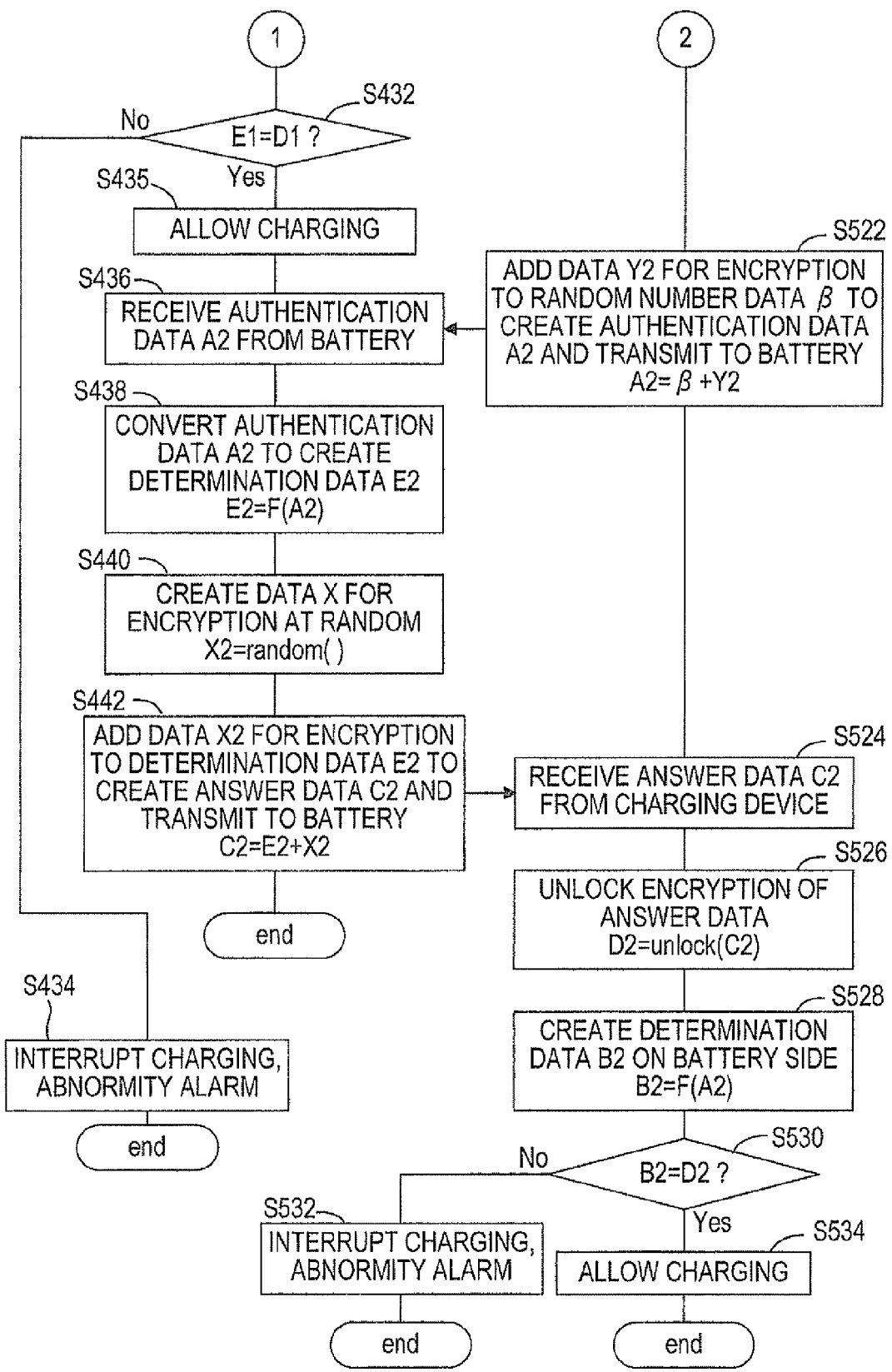
FIG. 7B is a flowchart showing an authentication routine 2 on the charging device side and the battery side according to the second embodiment.

FIG. 7 shows an authentication routine 2 which is performed by the microcomputer 110 of the battery pack 100 and the microcomputer 210 of the charging device 200 instead of the authentication routine 1 in FIG. 6 described above. The authentication routine on the charging device 200 side is shown in S420 to S442. The authentication routine on the battery pack 100 side is shown in S510 to S532.

Signs A1, B1, C1, D1, E1, X1 and Y1 in S420 to S442 and S510 to S532 in FIG. 7 correspond to signs A, B, C, D, E, X and Y in FIG. 6. The aforementioned description on the signs A, B, C, D, E, X and Y in FIG. 6 should be also referenced with regard to the signs A1, B1, C1, D1, E1, X1 and Y1 in FIG. 7.

In addition, the microcomputers 110 and 210 start this process when detecting, based on the aforementioned temperature signal and communication signal, that the battery pack 100 and the charging device 200 are electrically connected to each other.

In an authentication routine 1 of FIG. 6, the transmission and reception of data between the charging device 200 and the battery pack 100 are performed only once, and only the charging device 200 side has performed the authentication of the battery pack 100. On the other hand, in the authentication routine 2 of FIG. 7, the transmission and reception of data between the battery pack 100 and charging device 200 are performed twice, and the charging device 200 side performs the authentication of the battery pack 100 while the battery pack 100 side performs the authentication of the charging device 200.

(Authentication Routine on the Charging Device 200 Side)

First, authentication routine on the charging device 200 side will be explained. Since S420 to S434 are substantially the same as S400 to S414 in FIG. 6, description thereof will not be repeated.

If determination data E1 is equal to unlocked data D1 (S432: Yes), the microcomputer 210 of the charging device 200 determines that the battery pack 100 is an authentic product, and allows charging of the battery pack 100 (S435). Then, the microcomputer 210 receives authentication data A2 from the battery pack 100 (S436). The authentication data A2 is transmitted from the microcomputer 110 of the battery pack 100 in a process of later described S522.

The microcomputer 210 converts the received authentication A2 using the formula F(A2) (this conversion may be defined as the first conversion on the charging device 200 side) to create determination data E2 on the charging device 200 side (S438).

Further, the microcomputer 210 creates data X2 for encryption based on the voltage data or temperature data of the battery pack 100 so as to encrypt the determination data E2 (S440). The microcomputer 210 creates answer data C2 by adding the data X2 for encryption to the determination data E2 in a prescribed manner (this process may be defined as the second conversion on the charging device 200 side), and transmits the answer data C2 to the battery pack 100 via the microcomputer terminal receiving section 204 (S442). Thereafter, this routine is terminated.

(Authentication Routine on the Battery Pack 100 Side)

Since S610 to S516 in FIG. 7 are substantially the same as S500 to S506 in FIG. 6, description thereof will not be repeated. The microcomputer 110 of the battery pack 100, after running the process of S516, creates random number data 8 based on the voltage data or temperature data of the battery pack 100 (S518).

Moreover, the microcomputer 110 creates data Y2 for encryption based on the voltage data or temperature data of the battery pack 100 so as to encrypt the random number data 6 (S520). Then, the microcomputer 110 creates the authentication data A2 by adding the data Y2 for encryption to the random number data 6 in a prescribed manner and transmits the created authentication data A2 to the charging device 200 via the microcomputer terminal section 104 (S522). The authentication data A2 is received in the aforementioned process of S436 by the microcomputer 210 of the charging device 200.

The microcomputer 110, when receiving from the charging device 200 the answer data C2 created by performing the first and second conversions to the authentication data A2 (S524), unlocks encryption by the second conversion performed on the charging device 200 side and creates unlocked data D2 from the answer data C2 (S526). Then, the microcomputer 110 converts the authentication data A2 using the same formula F(A2) as in the first, conversion in the charging device 200, to create determination data B2 on the battery pack 100 side (S528).

Next, the microcomputer 110 determines whether or not the determination data B2 is equal to the decrypted unlocked data D2 (S530). If the determination data B2 is equal to the unlocked data D2 (S530: Yes), the microcomputer 110 determines that the charging device 200 is an authentic product and allows charging from the charging device 200 (S534). Thereafter, this routine is terminated.

If the determination data B2 is different from the unlocked data D2 (S530: No), the microcomputer 110 determines that the charging device 200 is an inauthentic product, and interrupts charging from the charging device 200 and turns on not shown LEDs for warning as alarm light for abnormity (S532). Thereafter, this routine is terminated. If the battery pack 100 is equipped with a buzzer or speaker, the battery pack 100 may also alarm the user of abnormity by beeps from the buzzer or speaker, instead of turning on the LEDs.

In the authentication routine 2, the authentication data is transmitted, in the first transmission and reception, to the battery pack 100 from the charging device 200. Then, the authentication data is converted in the battery pack 100. The answer data which is converted data is transmitted to the charging device 200 from the battery pack 100. The answer data is reverse converted in the charging device 200. It is then determined in the charging device 200 whether or not the battery pack 100 is an authentic product. In the second transmission and reception, the authentication data is transmitted to the charging device 200 from the battery pack 100. The authentication data is converted in the charging device 200. The answer data which is converted data is transmitted to the battery pack 100 from the charging device 200. The answer data is reverse converted in the battery pack 100. It is then determined in the battery pack 100 whether or not the charging device 200 is an authentic product.

The order of the first authentication process and the second authentication process of the authentication routine 2 may be replaced.

That is, in the first transmission and reception, the authentication data may be transmitted to the charging device 200 from the battery pack 100 and converted in the charging device 200. The answer data which is converted data may be transmitted to the battery pack 100 from the charging device 200 for reverse conversion. Then, whether or not the charging device 200 is an authentic product may be determined in the battery pack 100. Further, in the second transmission and reception, the authentication data may be transmitted to the battery pack 100 from the charging device 200 and converted in the battery pack 100. The answer data which is converted data may be transmitted to the charging device 200 from the battery pack 100 for reverse conversion. Then, whether or not the battery pack 100 is an authentic product may be determined in the charging device 200.

In the second embodiment described above, in addition to whether or not the battery pack 100 is an authentic product is determined in the charging device 200, whether or not the charging device 200 is an authentic product is determined in the battery pack 100.

This can inhibit the authentic charging device 200 from damage due to charging the inauthentic battery pack 100, or the battery pack 100 from generation of abnormal heat. In addition, it is possible to inhibit the authentic battery pack 100 from damage due to being charged by the inauthentic charging device 200.

In the second embodiment, with respect to the charging device 200, S420 to S424 in FIG. 7 correspond to an example of the function of the authentication data creating unit, S424 corresponds to an example of the function of the transmission unit, S426 corresponds to an example of the function of the receiving unit, S428 corresponds to an example of the function of the reverse conversion unit, S430 corresponds to an example of the function of the conversion unit, S432 and S435 correspond to an example of the function of the determination unit, and S434 corresponds to an example of the function of the warning unit.

In addition, with regard to the battery pack 100, S510 in FIG. 7 corresponds to an example of the function of the receiving unit, S512 to S516 correspond to an example of the function of the conversion unit, and S516 corresponds to an example of the function of the transmission unit.

Third Embodiment

A third embodiment of the present invention will be explained based on FIG. 8.

Figure 8:
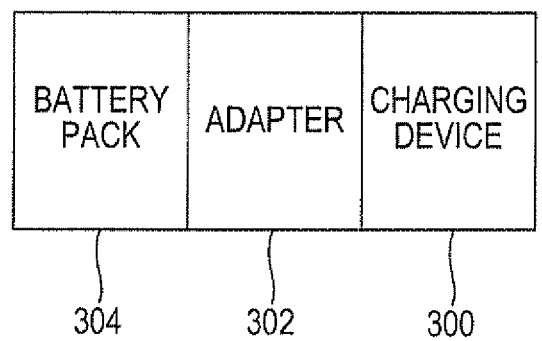
FIG. 8 is a block diagram showing a connection state when an adapter according to a third embodiment is used.

As shown in FIG. 8, an adapter 302 may be used for charging a battery pack 300 by a charging device 304. The adapter 302 is provided with a discharge circuit to forcibly discharge the battery pack 300 to be refreshed when the battery pack 300 is charged.

The battery pack 300 stores a refresh necessity flag which is set based on the number of charging times since the last refresh, for example. The adapter 302, when the battery pack 300 is attached as shown in FIG. 8, reads the refresh necessity flag stored in the battery pack 300.

The adapter 302, based on the necessity refresh flag, forces the battery pack 300 to discharge electricity by the discharge circuit of the adapter 302 for refresh if needed. On the other hand, the adapter 302, based on the necessity refresh flag read out from the battery pack 300, connects the battery pack 300 to the charging circuit of the charging device 304 to charge the battery pack 300 if refresh is not required.

Here, if the battery pack 300 is an inauthentic product, there is a risk of damage to the adapter 302 or the charging device 304 when the battery pack 300 is refreshed or charged in the state shown in FIG. 8.

Thus, the authentication routine shown in FIG. 6 or 7 may be performed between the adapter 302 and battery pack 300, in order to determine whether the battery pack 300 is an authentic product. If the battery pack 300 is an authentic product, the battery pack 300 may be refreshed or charged. If the battery pack 300 is an inauthentic product, refresh and charging of the battery pack 300 may be prohibited.

In the third embodiment, the adapter 302 corresponds to the battery connection device of the present invention.

Other Embodiments

If the battery pack 100 is an inauthentic product which is a copy of an authentic product, there is a risk of damage to not only the charging device 200 that charges the battery pack 100 but also the battery connection device to which the battery pack 100 is attached and electric power is supplied from the battery pack 100, when electric power is supplied from the battery pack 100.

Therefore, in order to authenticate whether or not the battery pack 100 is an authentic product, the driver drill body 12 shown in FIGS. 1 and 2, as the battery connection device, may perform the authentication routine shown in FIG. 6 or 7, for example. In this case, in the authentication routine shown in FIG. 6 or 7, the charging device 200 can be replaced by the driver drill body 12.

Also, in a case of a battery connection device to which the battery pack 100 is attached and electric power is supplied from the battery pack 100 for electric power tool, not only the electric power tool body like the driver drill body 12 but, for example, electronic products such as a radio or electrical appliances such as a vacuum cleaner may perform authentication of the battery pack 100 on behalf of the charging device 200 above.

Also, in the embodiment described above, authentication data (temporarily referred to as B) is created by the first conversion which converts the random number data (temporarily referred to as a) using the formula F(α). In the second conversion, encryption of adding data for encryption in a prescribed manner to the authentication data B is performed in the charging device 200 and the battery pack 100. In contrast, for example, instead of the process of S504 and S506 shown in FIG. 6, a process of converting the authentication data B using a formula G(B) may be used as the second conversion In this case, by performing the second conversion using the one fixed formula G(B), storage capacity can be lower than if a plurality of types of formulas are stored and one formula is chosen therefrom to perform the second conversion.

In addition, instead of the process of encrypting the random number data with the data for encryption to create the authentication data in S400 to S404 in FIG. 6, S420 to S424 and S518 to S522 in FIG. 7, the random number data may not be encrypted and transmitted directly as the authentication data.

Also, the first conversion is not limited to converting the authentication data A using the formula F(A). For example, like the second conversion of the above-described embodiment, the first conversion may be an encryption process of adding data for encryption to the original data in a prescribed manner.

That is, the first conversion and the second conversion in the present invention indicate that some conversion is performed to the original data.

In the above embodiment, the functions of the receiving unit, conversion unit and transmission unit are achieved by the microcomputer 110 of which functions are specified by a control program. The functions of the authentication data creating unit, conversion unit, transmission unit, receiving unit, reverse conversion unit, determination unit and warning unit are realized by the microcomputer 210 of which functions are specified by the control program. On the other hand, at least some functions of the above units may be implemented in hardware of which functions are specified by the circuit configuration itself.

Thus, the present invention is not limited to the embodiments described above, and can be applied to various embodiments without departing from the scope thereof.

The invention claimed is:

1. A battery connection device that is electrically connected to a battery pack for electric power tools, the device comprising:
    an authentication data creating unit that creates authentication data;
    a conversion unit that performs a first conversion of the authentication data created by the authentication data creating unit;
    a transmission unit that transmits to the battery pack the authentication data created by the authentication data creating unit when the battery pack is electrically connected to the battery connection device;
    a receiving unit that receives from the battery pack a battery-side conversion result that is data obtained after the authentication data is converted by the battery pack;
    a reverse conversion unit that, on an assumption that the battery pack as an authentic product creates the battery-side conversion result by performing the first conversion and further a second conversion on the authentication data, performs a reverse conversion of the second conversion on the battery-side conversion result received by the receiving unit; and
    a determination unit that compares a result of the reverse conversion performed by the reverse conversion unit with a result of the first conversion performed by the conversion unit and determines whether or not the battery pack is an authentic product.

2. The battery connection device according to claim 1, wherein the battery connection device is a charging device of the battery pack.

3. The battery connection device according to claim 2, wherein the determination unit, if it determines that the result of the reverse conversion is equal to the result of the first conversion, allows charging of the battery pack.

4. The battery connection device according to claim 2, wherein
    the determination unit, if the result of the reverse conversion is different from the result of the first conversion, prohibits or restricts charging of the battery pack, and
    the battery connection device further comprises a warning unit that, if the determination unit determines that the result of the reverse conversion is different from the result of the first conversion, warns of abnormity.

5. The battery connection device according to claim 1, wherein
    the battery connection device is a electric power tool body powered by the battery pack.

6. The battery connection device according to claim 5, wherein
    the determination unit, if it determines that the result of the reverse conversion is equal to the result of the first conversion, allows supply of electric power from the battery pack.

7. The battery connection device according to claim 5, wherein
    the determination unit, if it determines that the result of the reverse conversion is different from the result of the first conversion, prohibits supply of electric power from the battery pack, and
    the battery connection device further comprises a warning unit that, if the determination unit determines that the result of the reverse conversion is different from the result of the first conversion, warns of abnormity.

8. The battery connection device according to claim 1, wherein
    the conversion unit performs the first conversion using one fixed formula.

9. The battery connection device according to claim 1, wherein the authentication data creating unit creates the authentication data by encrypting specified random number data with specified data for encryption.

10. The battery connection device according to claim 9, wherein the authentication data creating unit is configured to create the random number data based on either voltage data or temperature data of the battery pack.

11. The battery connection device according to claim 10, wherein the authentication data creating unit is configured to create the data for encryption based on either voltage data or temperature data of the battery pack.

* * * * *